United States Patent
Wang (10) Patent No.: US 11,940,706 B2
(45) Date of Patent: Mar. 26, 2024

(54) BACKPLANE, DIMMING METHOD THEREOF, AND DISPLAY DEVICE HAVING SAME

(71) Applicant: TCL China Star Optoelectronics Technology Co., Ltd., Shenzhen (CN)

(72) Inventor: Yanan Wang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/960,553

(22) PCT Filed: May 19, 2020

(86) PCT No.: PCT/CN2020/090940
§ 371 (c)(1),
(2) Date: Jul. 8, 2020

(87) PCT Pub. No.: WO2021/203525
PCT Pub. Date: Oct. 14, 2021

(65) Prior Publication Data
US 2023/0122047 A1   Apr. 20, 2023

(30) Foreign Application Priority Data

Apr. 9, 2020   (CN) .......................... 202010274405.X (51) Int. Cl.
*G02F 1/19* (2019.01)
*G02F 1/01* (2006.01)

(52) U.S. Cl.
CPC .............. *G02F 1/19* (2013.01); *G02F 1/0121* (2013.01); *G02F 2203/055* (2013.01); *G02F 2203/10* (2013.01)

(58) Field of Classification Search
CPC .... G02F 1/19; G02F 1/0121; G02F 2203/055; G02F 2203/10; G02F 1/15; G02F 1/1514; G02F 2201/15145; G02F 1/163
See application file for complete search history.

(56) References Cited

U.S. PATENT DOCUMENTS

| | | | |
|---|---|---|---|
| 5,645,758 A * | 7/1997 | Kawasumi | G02F 1/132 428/1.31 |
| 6,111,685 A | 8/2000 | Tench et al. | |
| 2005/0007505 A1* | 1/2005 | Faris | C09D 11/17 349/16 |

(Continued)

FOREIGN PATENT DOCUMENTS

| | | |
|---|---|---|
| CN | 105807526 A | 7/2016 |
| CN | 105829960 A | 8/2016 |

(Continued)

*Primary Examiner* — Christopher Stanford
*Assistant Examiner* — Journey F Sumlar
(74) *Attorney, Agent, or Firm* — Nathan & Associates; Menachem Nathan (57) ABSTRACT

A backplane, a dimming method thereof, and a display device having same are disclosed. The display device includes the backplane which has a first substrate and a second substrate opposite to each other, an electrolyte layer, and a driving electrode which is connected to the first substrate and the second substrate, respectively. When the driving electrode is controlled to apply different voltages between the first substrate and the second substrate, the electrolyte layer shows different translucent states.

14 Claims, 5 Drawing Sheets

(56) References Cited

U.S. PATENT DOCUMENTS

2007/0236768 A1   10/2007  Kawahara
2016/0313626 A1   10/2016  Mochizuka
2019/0004386 A1*  1/2019  Bergh .................. G02F 1/1525
2020/0259237 A1*  8/2020  Shrivastava ............ G02F 1/163

FOREIGN PATENT DOCUMENTS

| | | | |
|---|---|---|---|
| CN | 106940499 A | | 7/2017 |
| CN | 108604034 A | | 9/2018 |
| CN | 109782475 A | | 5/2019 |
| CN | 110320722 A | | 10/2019 |
| CN | 110824771 A | | 2/2020 |
| JP | 2018072490 A | * | 5/2018 |
| KR | 20190075634 A | | 7/2019 |

* cited by examiner

BACKPLANE, DIMMING METHOD THEREOF, AND DISPLAY DEVICE HAVING SAME

FIELD OF INVENTION

The present disclosure relates to display technology, and especially relates to a backplane, a dimming method thereof, and a display device having same.

BACKGROUND OF INVENTION

Transparent display has gradually developed in the field of display in recent years. The transparent display characteristic tremendously extend the application scenario of the display, and make information exchange convenient, and the amount of information presented can also increase accordingly.

However, the present transparent display face a major problem of the influence of ambient light. When the intensity of the ambient light fluctuate unstably or increase significantly, the image contrast would be greatly affected by the upper limit of the brightness of a display screen, leading to deterioration of the image quality, and display failure in severe cases. For example, the image still exists but cannot be recognized by the human eye. For mobile transparent display applications, such as augmented reality and vehicle front windshield display (a front windshield loaded with images), the problem may become prominent even more. Because in these two conditions, the light intensity of the surrounding keeps changing, therefore the display quality cannot maintain normal functioning.

Therefore, it is necessary to provide a new backplane, a dimming method thereof, and a display device having same to overcome problems that exist in the prior art.

Technical Problem

The purpose of the present disclosure is to provide a backplane, a dimming method thereof, and a display device having same. In in the process of real time transparent display, the backplane can adjust the light transmission amount to achieve real time regulation of background light intensity of the display according to change of the ambient light, and maintain the normal display quality of the display screen.

SUMMARY OF INVENTION

In order to achieve aforementioned purpose, the present disclosure provides a backplane comprising a first substrate and a second substrate opposite to each other; an electrolyte layer and a driving electrode; specifically, the electrolyte layer is disposed between the first substrate and the second substrate, and including an electrolytic solution; the driving electrode is connected to the first substrate and the second substrate, respectively; when the driving electrode is controlled not to apply voltage to the first substrate and the second substrate, the backplane is in a transparent state; when the driving electrode is controlled to apply a first voltage to the first substrate and the second substrate, the electrolytic solution is electrolyzed to form metal agglomerates which attach to a surface of the first substrate, and thus the backplane is in a semi-transparent state; when the driving electrode is controlled to apply a second voltage to the first substrate and the second substrate, the electrolytic solution is electrolyzed to form metal particles, which attach to the surface of the first substrate to form a metal layer, and thus the backplane is in a reflective state; when the driving electrode is controlled to apply a third voltage to the first substrate and the second substrate, the electrolytic solution is electrolyzed to form metal particles which attach to the surface of the second substrate, and thus the backplane is in a dark state.

Furthermore, one side of the first substrate is a light incoming surface, the driving electrode comprises an anode and a cathode, the anode is connected to the first substrate, and the cathode is connected to the second substrate, wherein when the first voltage is applied, an initial value of the first voltage is a transient high voltage to cause that the electrolytic solution is electrolyzed to form the metal agglomerates; after the first voltage is applied for a certain time, a low voltage is applied and maintained to cause that the metal particles attach to the surface of the first substrate to form agglomerates, and thus the backplane is in the semi-transparent state.

Furthermore, one side of the first substrate is a light incoming surface, the driving electrode comprises an anode and a cathode, the anode is connected to the first substrate, and the cathode is connected to the second substrate, wherein when the second voltage is applied, the electrolytic solution is electrolyzed to form the metal particles which attach to the surface of the first substrate and form the metal layer, and thus the backplane is in the reflective state.

Furthermore, one side of the first substrate is a light incoming surface, the driving electrode comprises an anode and a cathode, the anode is connected to the first substrate, and the cathode is connected to the second substrate, wherein when the third voltage is applied, the electrolytic solution is electrolyzed to release silver atoms which attach to nanoparticles on the surface of the second substrate, and thus the backplane is in the dark state.

Furthermore, the electrolytic solution comprises a mixture solution of $AgNO_3$ and $CuCl_2$.

Furthermore, the backplane further comprises a nanoparticle layer, disposed on one side of the driving electrode away from the second substrate.

Furthermore, the backplane further comprises a supporting layer, disposed between the first substrate and the second substrate.

Furthermore, the backplane further comprises a sealant disposed around edges of the first substrate and the second substrate, use for connecting the first substrate and the second substrate and is configured to seal the electrolyte layer.

The present disclosure also provides a dimming method for a backplane, comprising steps of:

providing a backplane comprising: a first substrate and a second substrate opposite to each other; an electrolyte layer disposed between the first substrate and the second substrate, and including electrolytic solution; and a driving electrode connected to the first substrate and the second substrate, respectively, wherein one side of the first substrate is a light incoming surface;

wherein when the driving electrode is controlled not to apply voltage to the first substrate and the second substrate, the backplane is in a transparent state;

when the driving electrode is controlled to apply a first voltage to the first substrate and the second substrate, the electrolytic solution is electrolyzed to form metal agglomerates which attach to a surface of the first substrate, and thus the backplane is in a semi-transparent state;

when the driving electrode is controlled to apply a second voltage to the first substrate and the second substrate, the electrolytic solution is electrolyzed to form metal particles which attach to the surface of the first substrate to form a metal layer, and thus the backplane is in a reflective state; and when the driving electrode is controlled to apply a third voltage to the first substrate and the second substrate, the electrolytic solution is electrolyzed to form metal particles which attach to the surface of the second substrate, and thus the backplane is in a dark state.

The present disclosure also provides a display device, comprising the backplane as described hereinabove.

Beneficial Effects

The present disclosure provides a backplane and dimming method thereof, and a display device having same. In the process of real time transparent display, the backplane can adjust the light transmission amount to achieve real time regulation of background light intensity of the display according to change of the ambient light, and maintain the normal display quality of the display screen. The backplane is a box-shaped structure that can adjust light transmission amount and penetration wave lengths of light under low driving voltage by using the localized surface plasmon resonance (LSPR) of precious metal particles. With real-time monitoring tools, the light transmission of the display can be electrically adjusted, and the absorption spectra of specific waveband may also be adjusted, thereby achieving real-time adjustment of background light intensity of the display, maintaining normal display quality of the display screen, and enhancing the quality and experience of outdoor display. Moreover, the display is light and low in energy consumption, and is compatible with head-mounted augmented reality device or vehicle front windshield display. The display is also simple in structure, does not require polarizer and has high light efficiency.

The reference numbers of the components in the figures are as follows:

1. first substrate, 2. electrolyte layer, 3. second substrate, 4. supporting layer, 5. sealant, 6. metal layer, 10. backplane, 11. transparent substrate, 12. driving electrode, 13. nanoparticle layer.

DETAILED DESCRIPTION OF PREFERRED EMBODIMENTS

In the following description, the technical solutions in the embodiments of the present disclosure is described clearly and completely in conjunction with the drawings in the embodiments of the present disclosure. Obviously, the embodiments described herein are only a part of the embodiments of the present disclosure instead of all embodiments of the present disclosure. Based on the embodiments in the present disclosure, all other embodiments obtained by those skill in the art without making creative effort fall within the scope of protection of the present disclosure.

It should be noted that in the drawings, the size of the layers and regions may be exaggerated for the clarity of illustration. It is understood that when a component or layer is referred to as being "on" another component or layer, it can be directly on top of the other component, or there may be intermediate layers between them. In addition, it is understood that when a component or layer is referred to as being "under" another component or layer, it can be directly under the other component, or more than one intervening layer or component may be present. In addition, it is also understood that when a layer or component is referred to as being "between" two layers or two components, it can be the only layer between the two layers or two components, or more than one intervening layer or component may also be present. Throughout the specification, identical reference signs indicate similar components.

Figure 1:
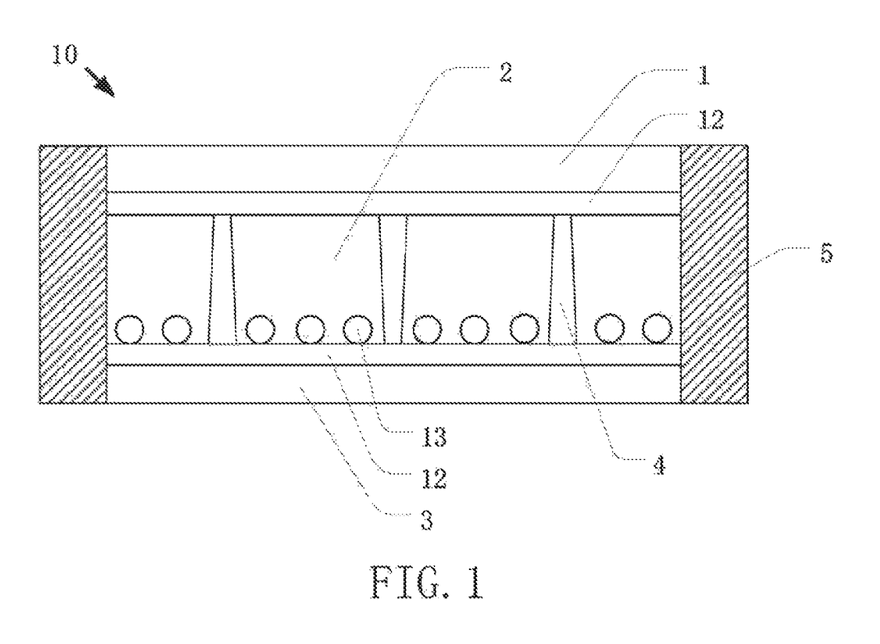
FIG. 1 is a structural schematic view of a backplane according to some embodiments of the disclosure.

Refer to FIG. 1. One embodiment of the present disclosure provides a backplane 10, including a first substrate 1, an electrolyte layer 2 and a second substrate 3. Specifically, the second substrate 3 and the first substrate 1 are disposed opposite each other. Both substrates are transparent substrates. The electrolyte layer 2 is disposed between the first substrate 1 and the second substrate 3. The electrolyte layer 2 includes an electrolytic solution which contains silver ions. Preferably, the electrolytic solution comprises a mixed solution of $AgNO_3$ and $CuCl_2$. The molar ratio of the $AgNO_3$ and the $CuCl_2$ is preferably (3-7):1, more preferably 5:1. The driving electrode 12 is connected to the first substrate 1 and the second substrate 3, respectively. When different voltages are applied between the first substrate 1 and the second substrate 3, the electrolyte layer 2 shows different transmission states.

Figure 2:
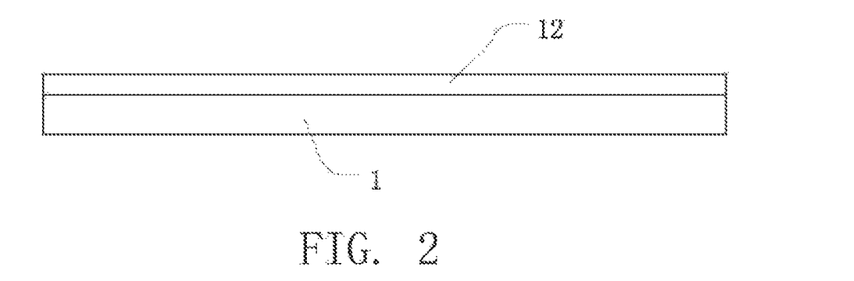
FIG. 2 is a structural schematic view of the first substrate of FIG. 1.
Figure 3:
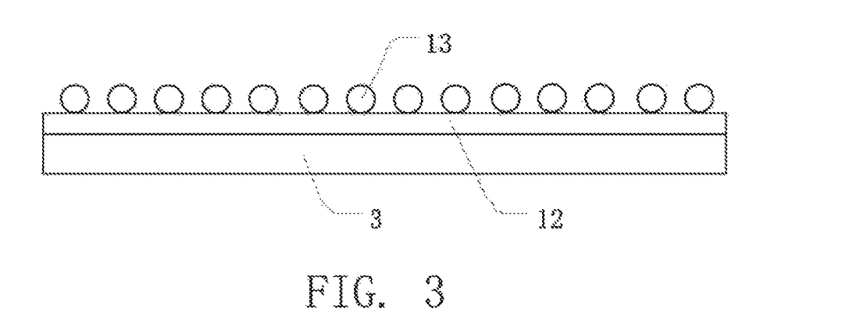
FIG. 3 is a structural schematic view of the second substrate of FIG. 1.

Refer to FIG. 2 and FIG. 3. FIG. 2 is a structural schematic view of the first substrate 1. FIG. 3 is a structural schematic view of the second substrate 3. Both the first substrate 1 and the second substrate 3 are transparent substrates, which may be made of conventional glass, or the two substrates may be flexible substrates. The side of the first substrate 1 is a light incident surface, and the side of the second substrate 3 is a light exit surface. The driving electrode 12 is disposed on the surfaces of the first substrate 1 and the second substrate 3 facing the electrolyte layer 2. The material of the driving electrode 12 includes indium tin oxide. The thickness of the driving electrode 12 is in a range of between 150 nm and 250 nm.

In the present embodiment, the electrolyte layer 2 shows different transmission states which include a transparent state, an opaque(dark) state, a semi-transparent state, and a reflective state.

When the driving electrode 12 does not apply voltage to the first substrate 1 and the second substrate 3, the backplane is in the transparent state. When the driving electrode 12 applies a first voltage to the first substrate 1 and the second substrate 3, the electrolytic solution is electrolyzed to release silver atoms which aggregate to form metal agglomerates. The metal agglomerates attach to the surface of the first substrate 1, the backplane 10 is in the semi-transparent state. When the driving electrode 12 applies a second voltage to the first substrate 1 and the second substrate 3, the electrolytic solution is electrolyzed to form metal particles which attach to the surface of the first substrate 1 forming a metal layer. The backplane 10 is in the reflective state. When the driving electrode 12 applies a third voltage to the first substrate 1 and the second substrate 3, the electrolytic solution is electrolyzed to form metal particles which attach to the surface of the second substrate 3, the backplane 10 is in the dark state.

In the present embodiment, preferably, the first voltage is a 4V pules and is switched to 1.5V after 20 ms. The second voltage is 2.5V. The more specific situation in actual use of the present embodiment is as follows.

Figure 4:
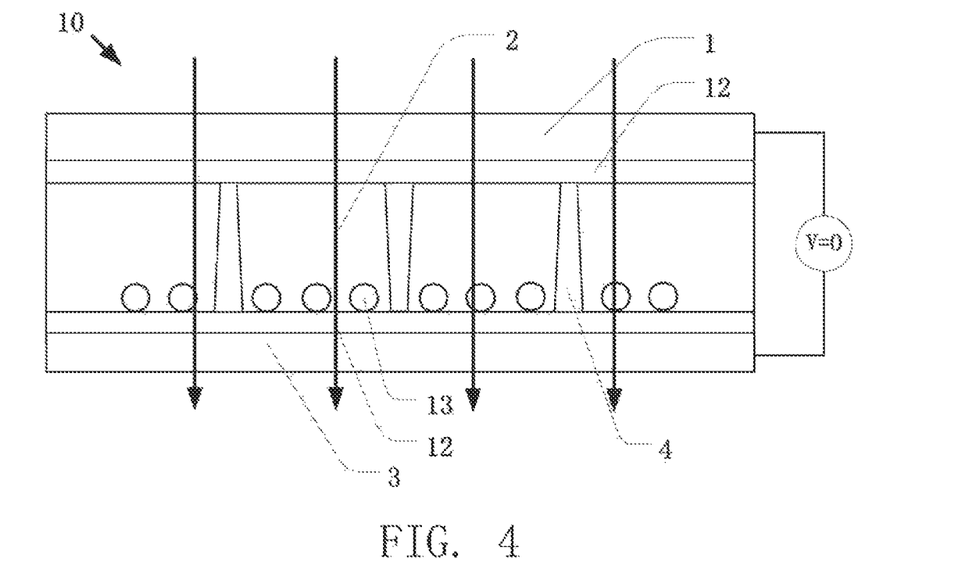
FIG. 4 is the optical path of the backplane when the backplane is in the transparent state according to some embodiments of the disclosure.

Refer to FIG. 4. FIG. 4 is the optical path of the backplane 10 when the backplane is in the transparent state. When the voltage between the first substrate 1 and the third voltage 3 is 0V, the electrolyte layer 2 is in the transparent state. In the transparent state, the display transparent displays normally and consumes no electricity. Light (indicated by arrows in the figure) can directly pass through the first substrate, the electrolyte layer 2 and the second substrate 3.

Figure 5:
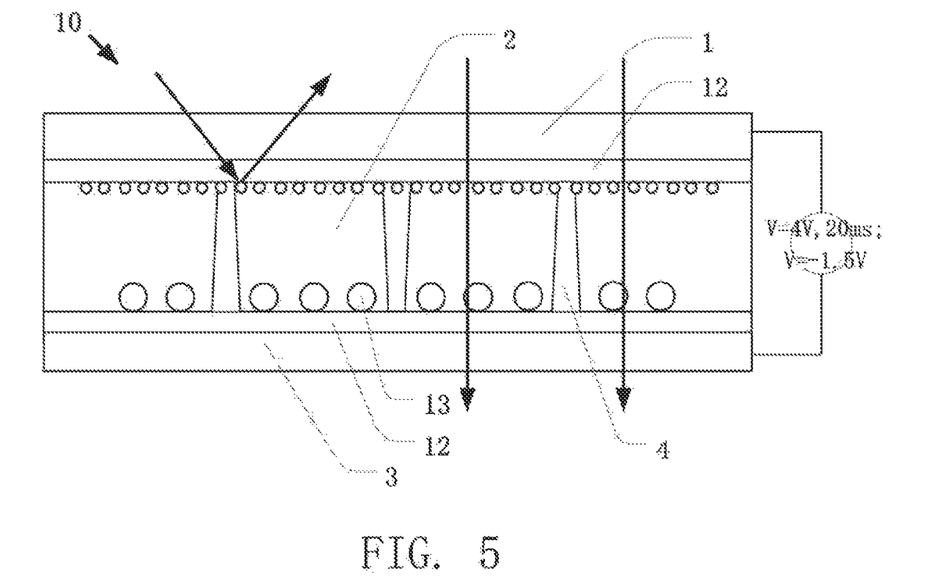
FIG. 5 is the optical path of the backplane when the backplane is in the semi-transparent state according to some embodiments of the disclosure.

Refer to FIG. 5. FIG. 5 is the optical path of the backplane 10 when the backplane 10 is in the semi-transparent state. The driving electrode comprises an anode and a cathode. The anode is connected to the first substrate 1 and the cathode is connected to the second substrate 3. Wherein, when the first voltage is applied, an the first voltage initial value is a transient high voltage (4V) that lasts for 20 ms. Wherein, the transient high voltage is a voltage of ~4V. At this time, the Ag$^+$ ions in the electrolytic solution are reduced in a very short period of time, forming silver atom agglomerates. After the first voltage is applied for 20 ms, a low voltage of 1.5V is applied and maintained. Wherein the low voltage is a voltage of –1.5V. The Ag atom agglomerates attach to the surface of the first substrate 1 under the drive of the low voltage. Because the density of the Ag atom agglomerates deposit on the surface of the first substrate is not high, the backplane 10 is in the semi-transparent state at this time. The semi-transparent state is a red transparent state which appropriately reduces external incident light and has a colour display effect that can enrich the display effect, reduce the influx of external light of harmful wavebands and can enhance visual experience. The principle is that after a pules voltage of –4V that last for 20 ms, drive using a voltage of –1.5V. In the process, the silver atoms will be reduced in a very short time and form silver agglomerates inside the electrolyte layer 2 at –4V. Because the transient strong electric field causes the ions to agglomerate first then began to attach to and grow on the first substrate 1, particles will form and then deposit onto the driving electrode 12 of the first substrate 1 under the driving force of the –1.5V voltage. The structural compaction of this layer is not high, so the layer can maintain a certain degree of transparency. Also, localized surface plasmon resonance (LSPR) occurs on the surface of the silver particles. Because the size of the particles is relatively small, the particles can only absorb part of the short wavelengths, and thus can display red color.

Figure 6:
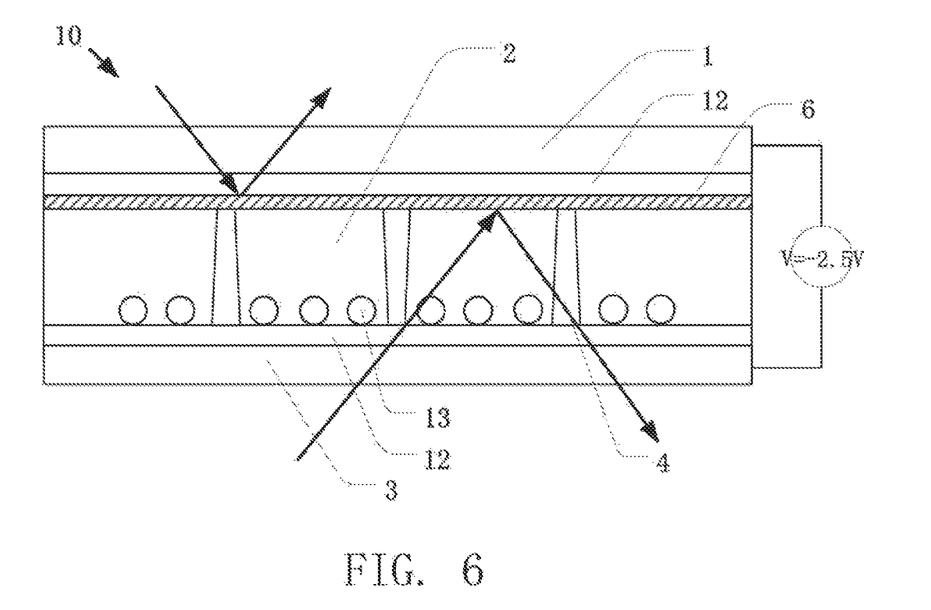
FIG. 6 is the optical path of the backplane when the backplane is in the reflective state according to some embodiments of the disclosure.

Refer to FIG. 6. FIG. 6 is the optical path of the backplane 10 when the backplane is in the reflective state. When the anode of the driving electrode 12 is connected to the first substrate 1, the cathode is connected to the second substrate 3, and the second voltage, which is –2.5V in the present embodiment, is applied, the anions in the electrolytic solution are reduced to slowly precipitate silver atoms. Driven by the –2.5V voltage, the silver atoms attach to the surface of the first substrate 1 to form a compact metal layer 6. In the present embodiment, the first substrate 1 is a transparent substrate and the metal layer 6 is a film. At this time, both sides of the backplane 10 are in a reflective state. That is, when light is incident from the first substrate 1, the light is reflected by the metal layer 6 upon reaching the metal layer 6 then exits from the first substrate 1. When light is incident from the second substrate 3, the light is reflected by the metal layer 6 upon reaching the metal layer 6 and then exits from the second substrate 3. In the reflective state, it can be collocated with vehicle display to achieve a mirror effect or to achieve effects of widening visual field or reducing energy incidence from the outside. The function may be used to confirm the visual field behind and to reflect external light back outside to lower the temperature inside the vehicle at the same time. The principal is that when the second voltage is –2.5V, the anions in the electrolyte layer 2 are reduced and precipitated on the driving electrode 12 of the first substrate 1. Because the speed of formation of the silver layer is slow, the silver layer is compact and can strongly reflect external light to form the reflective state. The corresponding reaction formula is as follows: $Ag^-=nBr^-\rightarrow AgBr_n^{1-n}$, $AgBr_n^{1-n}+e^-\rightarrow Ag+nBr^-$.

Figure 7:
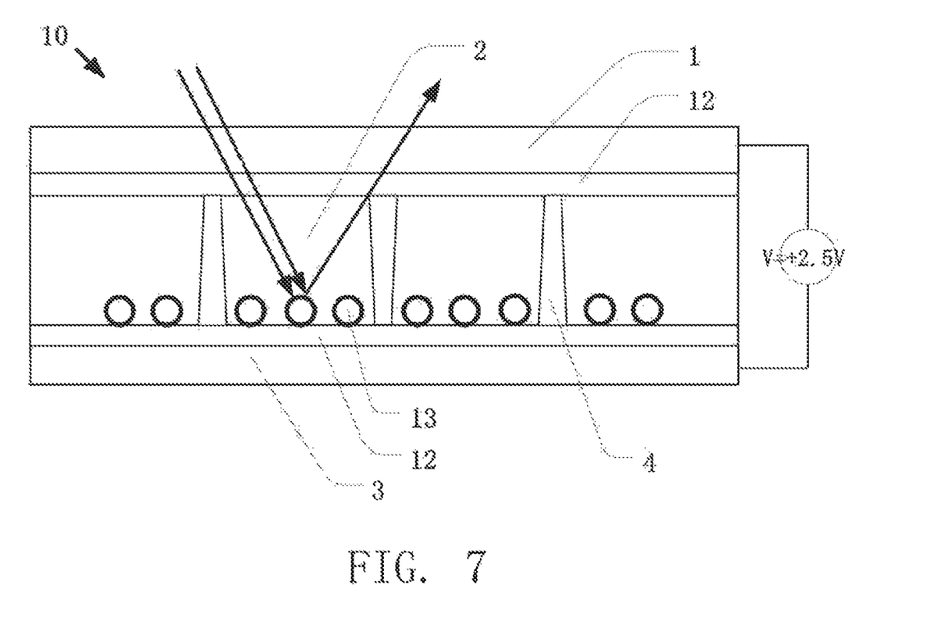
FIG. 7 is the optical path of the backplane when the backplane is in the dark state according to some embodiments of the disclosure.

Refer to FIG. 7. FIG. 7 is the optical path of the backplane 10 when the backplane 10 is in the dark state. When the anode of the driving electrode 12 is connected to the first substrate 1, the anode is connected to the second substrate 3, and the third voltage 2.5V is applied, the Ag$^+$ of the electrolytic solution is reduced at the cathode and attach to the nanoparticles on the surface of the second substrate 3 which is in connection with the cathode. In the present embodiment, because the Ag atoms are attach to the nanoparticles which are on the surface of the second substrate, thereby forming nanoparticles covered with Ag, at the time, surface plasmon resonance will occur on the surface, causing the incident light to be absorbed by the Ag covered nanoparticles. At the time, the backplane 10 is in the dark state. As shown in FIG. 7, when light is incident from the first substrate 1, after light reaches the nanoparticles, localized surface plasmon resonance effect will occur between the Ag atoms of the surface. Part of the light is absorbed, and part of the light is reflected and exits from the first substrate 1, so the dark state is presented. When in the opaque state (also called the dark state), the strong external incident light is reduced, the quality of the picture is ensured, and the energy consumption is low. The principal is that when under the third voltage 2.5V, the silver ions in the electrolyte layer 2 undergo a reduction reaction at the cathode and deposit on the surface of one side of the cathode. The light is absorbed, thereby presenting the dark state. Specifically, as shown in FIG. 3, the second substrate 3 further includes a nanoparticle layer 13 composed of nanoparticles. The thickness of the nanoparticle layer 13 is in a range of between 2 um and 5 um. The particle size of the nanoparticles in the nanoparticle layer 13 is in a range of between 8 nm and 30 nm. Silver ions undergo a reduction reaction at the driving electrode 12 of the second substrate 3 and deposited onto the nanoparticles of the nanoparticle layer 13, to form nanoparticles covered with silver shells. At this time, localized surface plasmon resonance (LSPR) occurs on the surface, causing the light to be absorbed, thus presenting the dark state. Because the backplane in the opaque is in the dark state, and can be applied in the condition in which the external light is too bright, thereby affecting the display, therefore, the backplane can be designed and patterned according to the needs, and the dark state control is performed in designated area, and can be achieved just by patterning the driving electrode 12 which constitutes the first substrate 1.

Refer to FIG. 1. in the present embodiment, the backplane 10 further comprises a supporting layer 4 disposed between the first substrate 1 and the second substrate 3. The supporting layer 4 comprises dot spacers or support columns used for forming a gap between the first substrate 1 and the second substrate 3, the electrolyte layer 2 is filled in the gap. The thickness of the supporting layer 4 is in a range of between 300 um and 500 um. Since the thickness of the supporting layer 4 is in a range of between 300 um-500 um, the thickness of the electrolyte layer 2 is also in a range of between 300 um-500 um.

Refer to FIG. 1. In the embodiment, the backplane 10 further comprises a sealant 5 which is disposed around edges of the first substrate 1 and the second substrate 3 and is configured to seal the electrolyte layer 2. The materials of the sealant 5 is preferably light solidification glues.

It is to be understand that the first substrate 1, the electrolyte layer 2, the second substrate 3, the supporting layer 4 and the sealant are connected to form a box-shaped structure which is similar to a LCD cell and is capable of adjusting light intensity and light spectrum to enhance the display effect and application range of the transparent display.

The present disclosure also provides a method for manufacturing the backplane 10, comprising steps of:
Providing a first substrate 1 and a second substrate 3, and manufacturing a driving electrode 12 on the surface of the first substrate 1 which is opposite the second substrate 3. The martial of the driving electrode 12 includes indium tin oxide. The thickness of the driving electrode is in a range of between 150 nm and 250 nm.

Disposing the second substrate 3 opposite the first substrate 1 and connecting the second substrate 3 with the first substrate 1. Preferably, the sealant 5 is used to make the connection. Then the gap between the first substrate 1 and the second substrate 3 is filled with the electrolytic solution to form an electrolyte layer 2. The electrolyte layer 2 includes an electrolytic solution. The electrolytic solution contains silver ions. Preferably the electrolytic solution comprises a mix solution of $AgNO_3$ and $CuCl_2$. The molar ratio of the $AgNO_3$ to the $CuCl_2$ is preferably (3-7):1, and more preferably 5:1; and when the driving electrode 12 is controlled to apply different voltages between the first substrate 1 and the second substrate 3, the electrolyte layer 2 presents different light transmission states. That is, the backplane 10 presents different light transmission states.

Wherein, refer to FIG. 3. The method for manufacturing the backplane 10 further comprises a step of:
manufacturing nanoparticle layer 13 on the side of the driving electrode 12 facing away from the second substrate 3. The thickness of the nanoparticle layer 13 is in a range of between 2 um and 5 um. The particle size of the nanoparticles in the nanoparticle layer 13 is in a range of between 8 nm and 30 nm.

In the actual process, the second substrate 3 is first treated with oxygen plasma (30 W, 10 minutes) after washed to increase the number of hydrogen bonds on the surface of the driving electrode 12 to increase its force of attachment with the nanoparticles. Then, the nanoparticles are coated onto the substrate. The substrate is dried for 30 minutes under 120° C. The particle size of the nanoparticles is in a range of between 8 nm to 30 nm. The martials of the nanoparticles includes indium tin oxide.

In the present embodiment, the method for manufacturing the backplane 10, further comprises a step of:
manufacturing a supporting layer 4 between the first substrate 1 and the second substrate 3.

The supporting layer 4 comprise dot spacers or support columns for forming a gap between the first substrate 1 and the second substrate 3. The gap is filled with the electrolyte layer. Since the thickness of the supporting layer 4 is in a range of between 300 um and 500 um, the thickness of the electrolyte layer 2 is also in a range of between 300 um and 500 um.

In the present embodiment, the method for manufacturing the backplane 10 further comprises a step of:
manufacturing a sealant around edges of the first substrate 1 and the second substrate 3. The sealant is configured to connect the first substrate 1 with the second substrate 3 and to seal the electrolyte layer 2.

The material of the sealant is preferably light solidification glues.

In the present embodiment, making the electrolytic solution comprises a step of:
Dissolving 0.5 millimoles of the $AgNO_3$ in 2.5 millimoles of the tetrabutylammonium bromide to prepare a $AgNO_3$ solution;
Dissolving 0.1 millimoles of the $CuCl_2$ in 10 milliliters of dimethyl sulfoxide and adding 10 wt % of polyvinyl butyral, which serves as the main polymer, to form a $CuCl_2$ solution; and
Mixing the $AgNO_3$ solution with the $CuCl_2$ solution in proportion and stirring and evenly mixing the solution, and forming the electrolytic solution.

Figure 8:
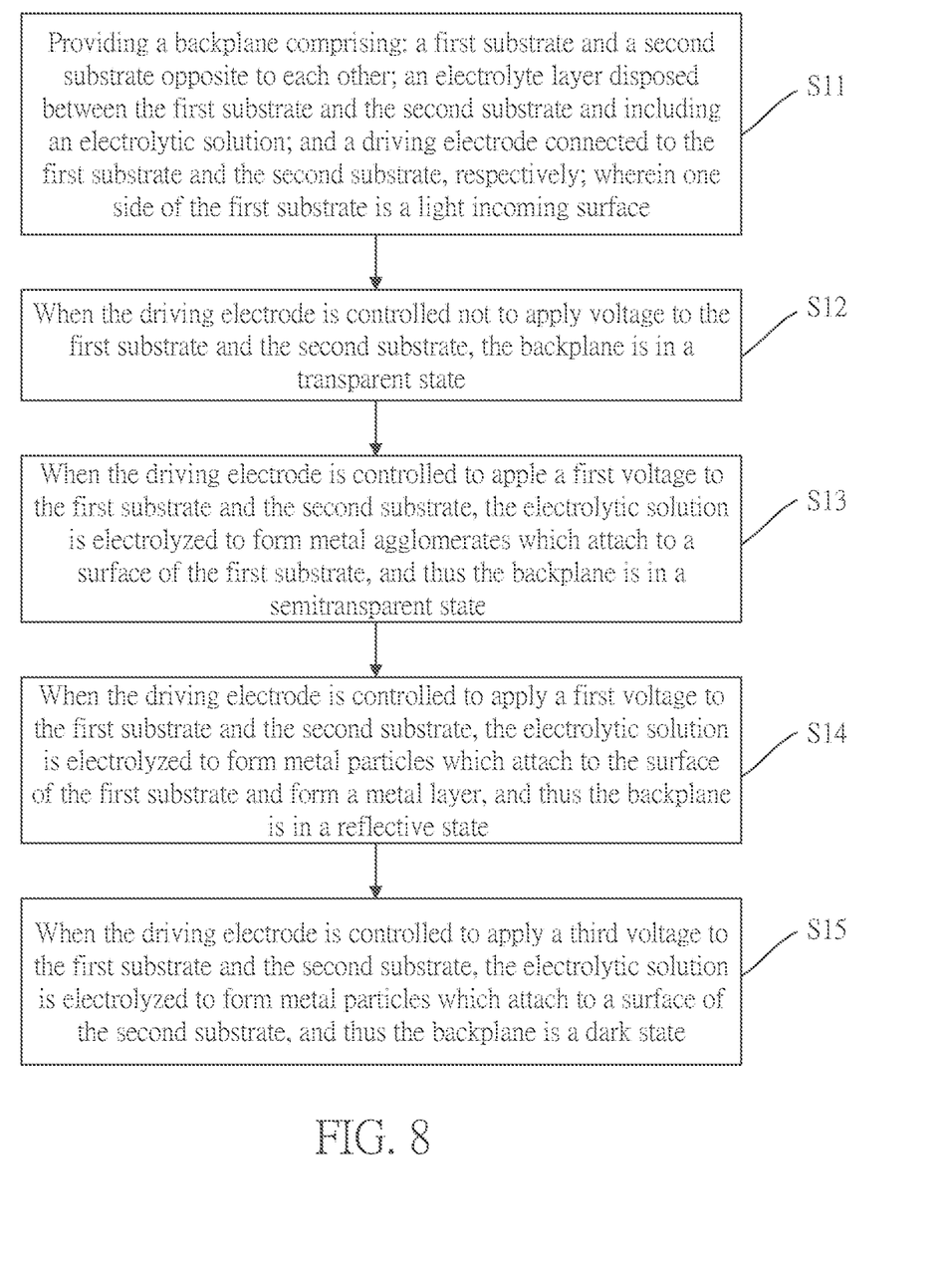
FIG. 8 is a flow chart of a dimming method for a backplane according to some embodiments of the disclosure.

Refer to FIG. 8, the present disclosure also provides a method for dimming a backplane comprises steps of:
S11, a backplane 10 is provided comprising: a first substrate 1 and a second substrate 3 opposite to each other; an electrolyte layer 2 disposed between the first substrate 1 and the second substrate 3, and including electrolytic solution; and a driving electrode 12 connected to the first substrate 1 and the second substrate 3, respectively, wherein one side of the first substrate 1 is a light incoming surface;
S12, when the driving electrode 12 is controlled not to apply voltage to the first substrate 1 and the second substrate 3, the backplane 10 is in a transparent state;
S13, when the driving electrode 12 is controlled to apply a first voltage to the first substrate 1 and the second substrate 3, the electrolytic solution is electrolyzed to form metal agglomerates which attach to a surface of the first substrate 1, and thus the backplane 10 is in a semi-transparent state;
S14, when the driving electrode 12 is controlled to apply a second voltage to the first substrate 1 and the second substrate 3, the electrolytic solution is electrolyzed to form metal particles which attach to the surface of the first substrate 1 to form a metal layer, and thus the backplane 10 is in a reflective state; and
S15, when the driving electrode 12 is controlled to apply a third voltage to the first substrate 1 and the second substrate 3, the electrolytic solution is electrolyzed to form metal particles which attach to the surface of the second substrate 3, and thus the backplane 10 is in a dark state.

About the principle of the method for dimming the backplane 10, refer to the principle description hereinabove, and unnecessary details will not be given here.

The present disclosure also provides a displace device comprising the backplane 10 as described hereinabove.

The present disclosure provides a backplane 10 and dimming method thereof, and a display device having same. In the process of real time transparent display, the backplane can adjust the light transmission amount to achieve real time regulation of background light intensity of the display according to change of the ambient light, and maintain the normal display quality of the display screen. The backplane is a box-shaped structure that can adjust light transmission amount and penetration wave lengths of light under low driving voltage by using the localized surface plasmon resonance (LSPR) of precious metal particles. With real-time monitoring tools, the light transmission of the display can be electrically adjusted, and the absorption spectra of specific waveband may also be adjusted, thereby achieving real-time adjustment of background light intensity of the display, maintaining normal display quality of the display screen, and enhancing the quality and experience of outdoor display. Moreover, the display is light and low in energy consumption, and is compatible with head-mounted augmented reality device or vehicle front windshield display. The display is also simple in structure, does not require polarizer and has high light efficiency.

The display device of the present disclosure can be applied to various occasions, can be combined with various devices and structures that can be a display panel or other devices with display function, such as tablet computers, televisions, display windows, augmented reality and vehicle front windshield displays. It is to be understand that, in order to realize the function, the display device of the present disclosure is provided with other devices and structures that are not presented in the present specification.

What is described hereinabove is merely the preferable embodiments of the present disclosure. It should be noted that one of ordinary skill in the art can make some improvements and modifications without depart from the scope of protection of the present disclosure.

What is claimed is:

1. A backplane, comprising:
   a first substrate and a second substrate opposite to each other;
   an electrolyte layer disposed between the first substrate and the second substrate, and including an electrolytic solution; and
   a driving electrode connected to the first substrate and the second substrate, respectively;
   wherein
   when the driving electrode is controlled not to apply voltage to the first substrate and the second substrate, the backplane is in a transparent state;
   when the driving electrode is controlled to apply a first voltage to the first substrate and the second substrate, the electrolytic solution is electrolyzed to form metal agglomerates which attach to a surface of the first substrate, and thus the backplane is in a semi-transparent state;
   when the driving electrode is controlled to apply a second voltage to the first substrate and the second substrate, the electrolytic solution is electrolyzed to form metal particles which attach to the surface of the first substrate to form a metal layer, and thus the backplane is in a reflective state; and
   when the driving electrode is controlled to apply a third voltage to the first substrate and the second substrate, the electrolytic solution is electrolyzed to form metal particles which attach to the surface of the second substrate, and thus the backplane is in a dark state;
   wherein one side of the first substrate is a light incoming surface, the driving electrode comprises an anode and a cathode, the anode is connected to the first substrate, and the cathode is connected to the second substrate, wherein when the first voltage is applied, an initial value of the first voltage is a transient high voltage to cause that the electrolytic solution is electrolyzed to form the metal agglomerates; after the first voltage is applied for a certain time, a low voltage is applied and maintained to cause that the metal particles attach to the surface of the first substrate to form agglomerates, and thus the backplane is in the semi-transparent state.

2. The backplane as claimed in claim 1, wherein one side of the first substrate is a light incoming surface, the driving electrode comprises an anode and a cathode, the anode is connected to the first substrate, and the cathode is connected to the second substrate, wherein when the third voltage is applied, the electrolytic solution is electrolyzed to release silver atoms which attach to nanoparticles on the surface of the second substrate, and thus the backplane is in the dark state.

3. The backplane as claimed in claim 1, wherein the electrolytic solution comprises a mixture solution of $AgNO_3$ and $CuCl_2$.

4. The backplane as claimed in claim 1, further comprising: a nanoparticle layer, disposed on one side of the driving electrode away from the second substrate.

5. The backplane as claimed in claim 1, further comprising: a supporting layer disposed between the first substrate and the second substrate.

6. The backplane as claimed in claim 1, further comprising: a sealant disposed around edges of the first substrate and the second substrate, and configured to seal the electrolyte layer.

7. A dimming method for a backplane, comprising steps of:
   providing a backplane comprising: a first substrate and a second substrate opposite to each other; an electrolyte layer disposed between the first substrate and the second substrate, and including electrolytic solution; and a driving electrode connected to the first substrate and the second substrate, respectively, wherein one side of the first substrate is a light incoming surface;
   wherein
   when the driving electrode is controlled not to apply voltage to the first substrate and the second substrate, the backplane is in a transparent state;
   when the driving electrode is controlled to apply a first voltage to the first substrate and the second substrate, the electrolytic solution is electrolyzed to form metal agglomerates which attach to a surface of the first substrate, and thus the backplane is in a semi-transparent state;
   when the driving electrode is controlled to apply a second voltage to the first substrate and the second substrate, the electrolytic solution is electrolyzed to form metal particles which attach to the surface of the first substrate to form a metal layer, and thus the backplane is in a reflective state; and when the driving electrode is controlled to apply a third voltage to the first substrate and the second substrate, the electrolytic solution is electrolyzed to form metal particles which attach to the surface of the second substrate, and thus the backplane is in a dark state;

wherein the driving electrode comprises an anode and a cathode, the anode is connected to the first substrate, and the cathode is connected to the second substrate, wherein when the first voltage is applied, an initial value of the first voltage is a transient high voltage to cause that the electrolytic solution is electrolyzed to form the metal agglomerates; after the first voltage is applied for a certain time, a low voltage is applied and maintained to cause that the metal particles attach to the surface of the first substrate to form agglomerates, and thus the backplane is in the semi-transparent state.

8. A display device, comprising the backplane as claimed in claim 1.

9. A backplane, comprising:
a first substrate and a second substrate opposite to each other;
an electrolyte layer disposed between the first substrate and the second substrate, and including an electrolytic solution; and
a driving electrode connected to the first substrate and the second substrate, respectively;
wherein
when the driving electrode is controlled not to apply voltage to the first substrate and the second substrate, the backplane is in a transparent state;
when the driving electrode is controlled to apply a first voltage to the first substrate and the second substrate, the electrolytic solution is electrolyzed to form metal agglomerates which attach to a surface of the first substrate, and thus the backplane is in a semi-transparent state;
when the driving electrode is controlled to apply a second voltage to the first substrate and the second substrate, the electrolytic solution is electrolyzed to form metal particles which attach to the surface of the first substrate to form a metal layer, and thus the backplane is in a reflective state; and when the driving electrode is controlled to apply a third voltage to the first substrate and the second substrate, the electrolytic solution is electrolyzed to form metal particles which attach to the surface of the second substrate, and thus the backplane is in a dark state;

wherein one side of the first substrate is a light incoming surface, the driving electrode comprises an anode and a cathode, the anode is connected to the first substrate, and the cathode is connected to the second substrate, wherein when the second voltage is applied, the electrolytic solution is electrolyzed to form the metal particles which attach to the surface of the first substrate and form the metal layer, and thus the backplane is in the reflective state.

10. The backplane as claimed in claim 9, wherein one side of the first substrate is a light incoming surface, the driving electrode comprises an anode and a cathode, the anode is connected to the first substrate, and the cathode is connected to the second substrate, wherein when the third voltage is applied, the electrolytic solution is electrolyzed to release silver atoms which attach to nanoparticles on the surface of the second substrate, and thus the backplane is in the dark state.

11. The backplane as claimed in claim 9, wherein the electrolytic solution comprises a mixture solution of $AgNO_3$ and $CuCl_2$.

12. The backplane as claimed in claim 9, further comprising: a nanoparticle layer, disposed on one side of the driving electrode away from the second substrate.

13. The backplane as claimed in claim 9, further comprising: a supporting layer disposed between the first substrate and the second substrate.

14. The backplane as claimed in claim 9, further comprising: a sealant disposed around edges of the first substrate and the second substrate, and configured to seal the electrolyte layer.

\* \* \* \* \*